F. G. HORNER.
MOTOR SLED.
APPLICATION FILED NOV. 13, 1916. RENEWED DEC. 17, 1917.

1,314,666.                                   Patented Sept. 2, 1919.
                                                  6 SHEETS—SHEET 3.

WITNESSES
John S. Schrott
L. A. Stanley

INVENTOR
Frank G. Horner
BY
Munn & Co
ATTORNEYS

UNITED STATES PATENT OFFICE.

FRANK G. HORNER, OF RUBY, TERRITORY OF ALASKA.

MOTOR-SLED.

1,314,666. Specification of Letters Patent. Patented Sept. 2, 1919.

Application filed November 13, 1916, Serial No. 131,026. Renewed December 17, 1917. Serial No. 207,472.

*To all whom it may concern:*

Be it known that I, FRANK G. HORNER, a citizen of the United States, and a resident of Ruby, in the Territory of Alaska, have invented certain new and useful Improvements in Motor-Sleds, of which the following is a specification.

My invention relates to improvements in motor sleds, and it consists in the combinations, constructions and arrangements hereinafter described and claimed.

An object of my invention is to provide a motor sled which may be used for transporting goods and passengers over the snow, especially in those northern countries where traveling is done largely in winter by means of dog sleds, the motor sled being designed to take the place of the dog sleds.

A further object of my invention is to provide a motor sled which is constructed so as to easily pass obstacles which the ordinary sled cannot pass.

A further object of my invention is to provide a motor sled in which the propelling mechanism is so designed as to effect an economy in the use of fuel.

A further object of my invention is to provide a sled of the type described which is of a flexible nature so as to accommodate itself to the inequalities of the ground or trail over which the sled is passing.

A further object of my invention is to provide a motor sled having novel means for breaking a trail.

Other objects and advantages will appear in the following specification, and the novel features of the invention will be particularly pointed out in the appended claims.

My invention is illustrated in the accompanying drawings forming a part of this application, in which.

Referring now particularly to Figs. 1 to 5 inclusive, I have shown therein a frame consisting of the top members 1 which extend from the front to the rear of the machine on each side thereof, and which is preferably composed of hickory wood. Beneath the upper members 1 are longitudinal frame members 2. The latter terminate short of the members 1 as indicated in the drawings. Substantially midway between the top and the bottom of the sled and on each side thereof, are longitudinal frame members 3. As will be seen from Fig. 10 there is a pair of these longitudinal members 3 on each side, one being on the inside and the other on the outside of a strut or brace member 4. These brace members 4 are disposed along the sides of the sled and are inclined to the rear, as shown in the drawings, the purpose being to provide a construction which will take up the thrust encountered by the runners without danger of so racking the sled as to cause it to break to pieces.

The floor beams 5 are mortised at their ends to enter openings in the braces 4, and these floor members are further secured to the braces by means of rawhide thongs 6.

Figure 10:
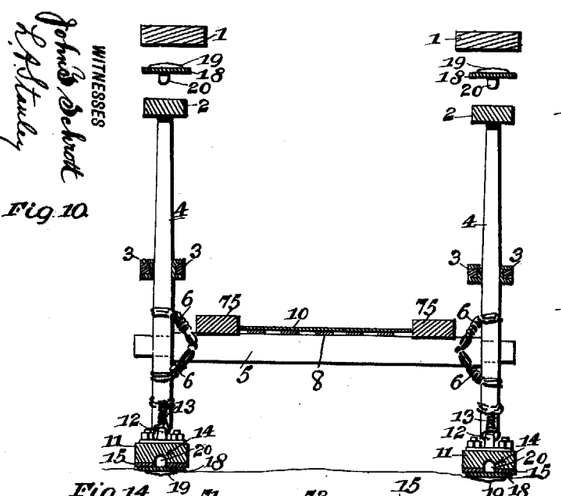
Fig. 10 is a section along the line 10—10 of Fig. 6.

As will be seen from Figs. 2 and 10, these thongs are secured to the brace members both above and below the floor members. In order to secure these thongs suitable holes are provided, by means of which the rawhide may be firmly attached. It has been found by experience that this form of connection is preferable to a rigid connection, since the latter if made of metal, tends to crystallize and will eventually break. The rawhide connection permits the frame of the sled to give, but will not permit the parts to separate. The upper portion of the brace members 4 is secured to the rail 2 by a rawhide connection 7. Extending longitudinally of the sled are frame members 75. Between these frame members I place light strips 8 which are parallel with the members 7 and which constitute the flooring. This flooring is generally topped by a piece of canvas 10 which may be removed so as to get rid of the snow which has accumulated. Any suitable flooring, however, may be used in lieu of that described.

Secured to the bottom of the struts or brace members 4 are the runners 11. The body portion of the runner is made of wood and these runners are mortised to receive the tongues $4^x$ of the brace members 4. In order to hold the parts together, I provide a rawhide connection. It will be seen that bolted to the body portion 11 of the runner are eyes 12 to which the rawhide thongs are secured, the upper end of these thongs being securely fastened to the base member. This forms a construction which gives slight play between the brace member and the runner, but which will not permit the parts to become separated.

Figure 1:
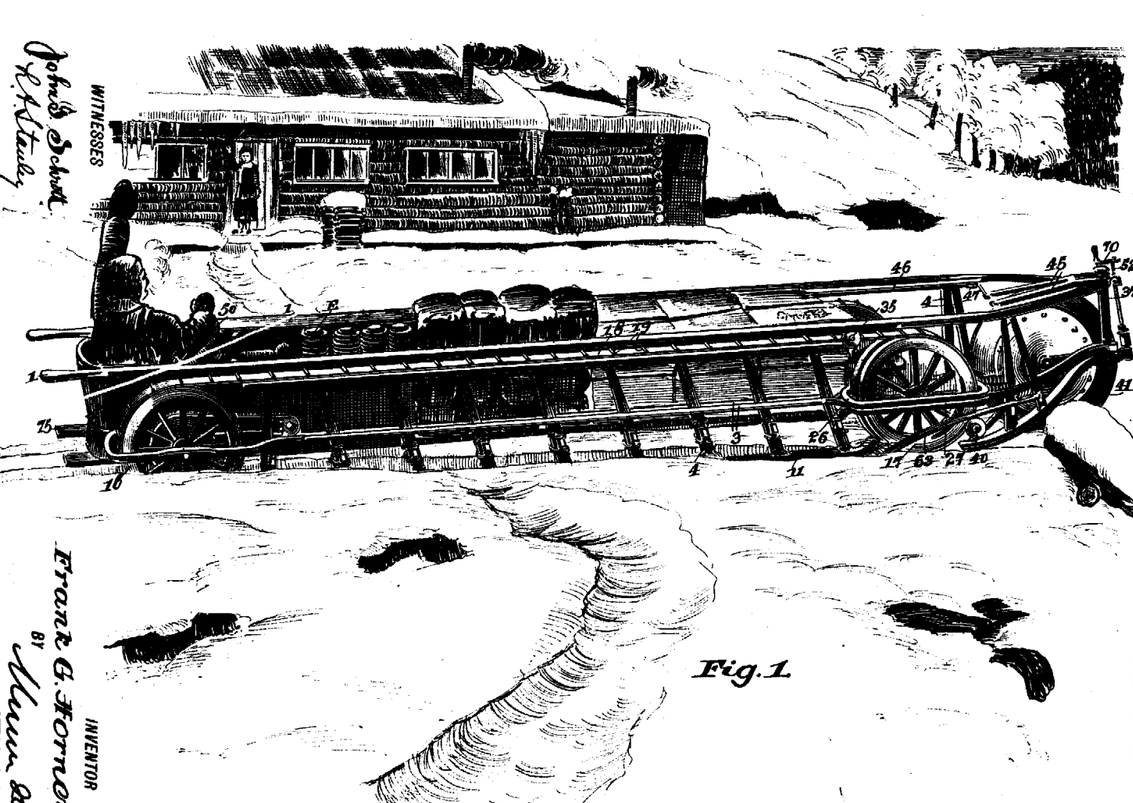
Figure 1 is a perspective view showing one embodiment of my invention.
Figure 2:
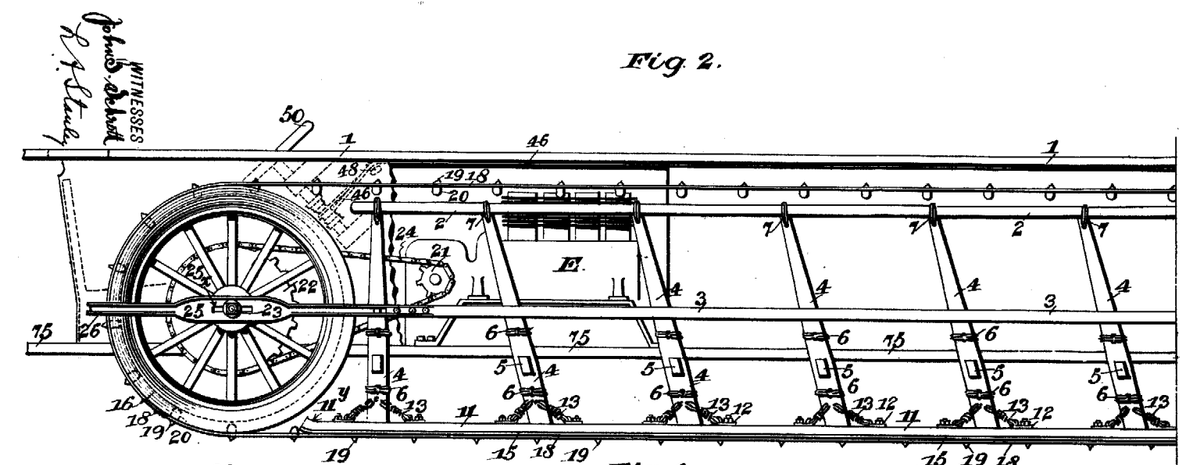
Fig. 2 is a side view of the rear half of the sled.
Figure 3:
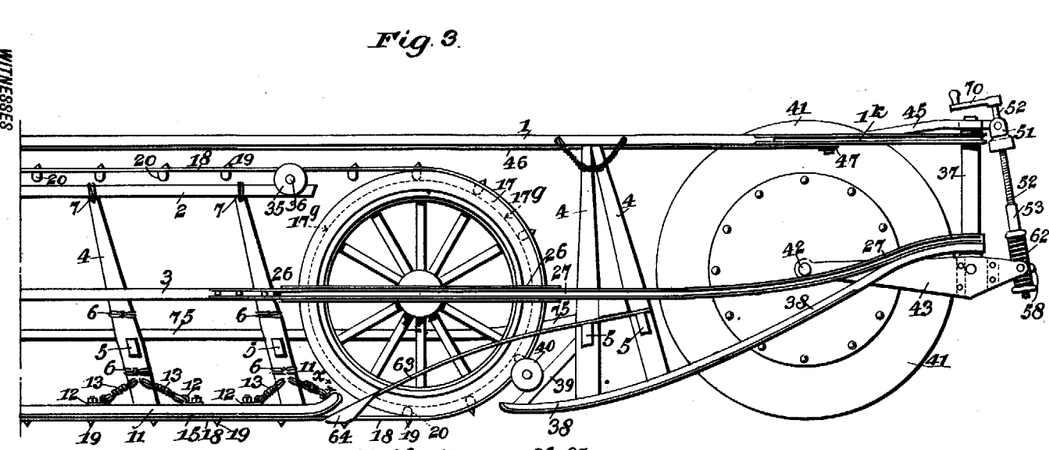
Fig. 3 is a side view of the front half of the sled.
Figure 4:
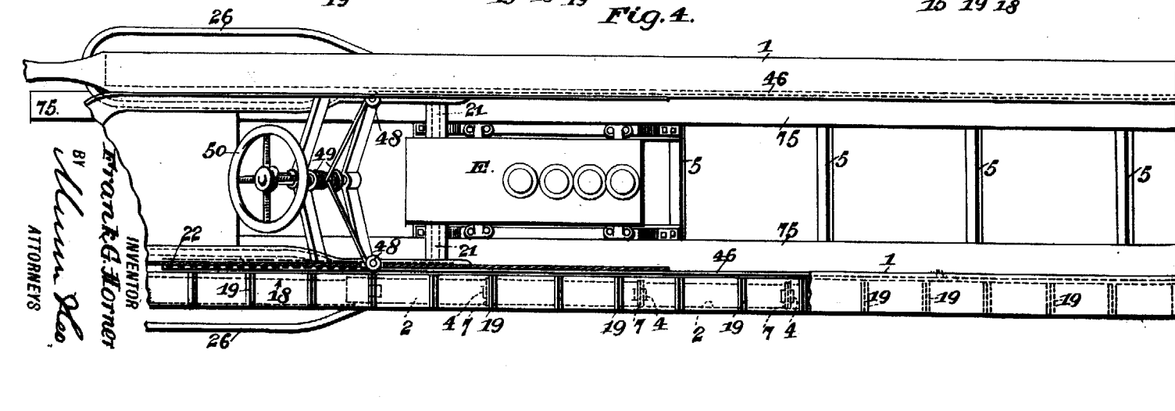
Fig. 4 is a plan view of the rear half of the sled.

The runners 11 do not extend the entire length of the machine, as will be seen from Figs 2 and 3. The forward end of the runner is curved upwardly as shown at $11^x$; the rear end of the runner is also slightly curved as shown at $11^y$. The body portion of the runner is of the shape shown in Fig. 11. It is provided with a central longitudinal groove 14 on its under side, and on each side of this groove and between the groove and the edge, is a metal shoe 15.

Figure 6:
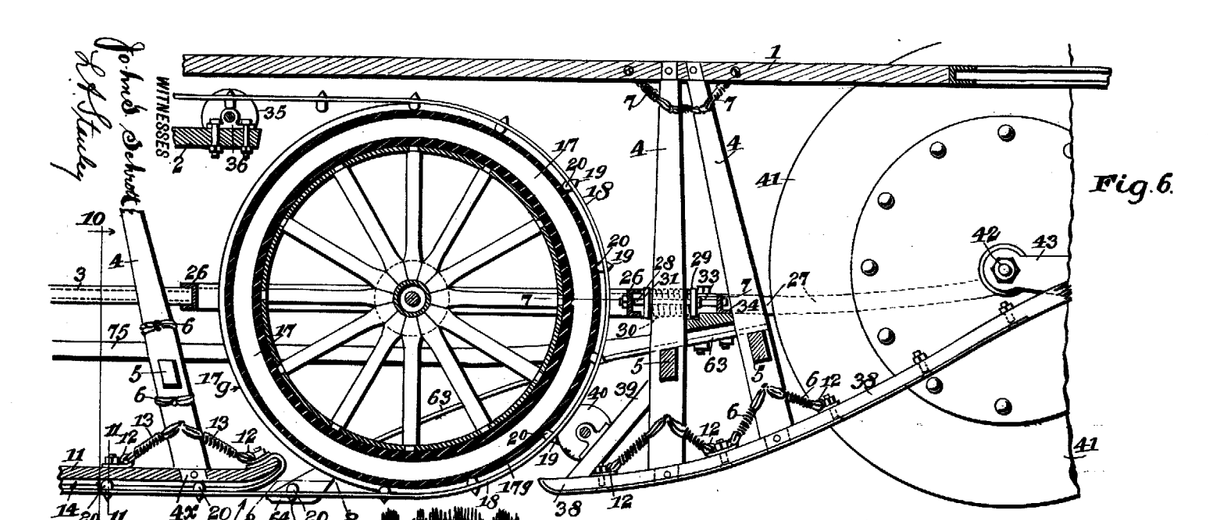
Fig. 6 is an enlarged section substantially on the line 6—6 of Fig. 5.
Figure 7:
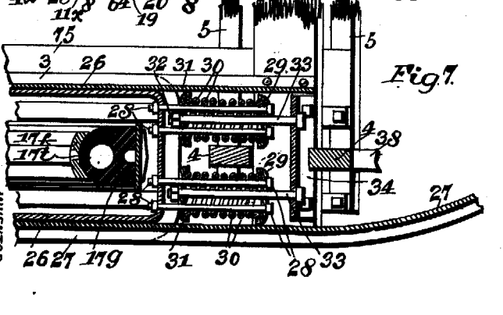
Fig. 7 is an enlarged section on the line 7—7 of Fig. 6.
Figures 8, 9:
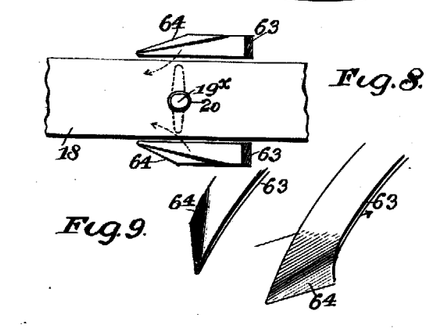
Fig. 8 is a bottom plan view showing a pair of the snow scoops for feeding snow between the runners and the endless belt.
Fig. 9 is a perspective view of the scoops shown in Fig. 8.

As will be seen from the drawings, there is a pair of drive wheels at the rear of the sled, these drive wheels being shown at 16. Toward the front of the machine is a pair of idlers 17 which are similar to the wheel 16. In Figs. 6 and 7 I have shown the detailed construction of wheel. The spokes are secured to a felly $17^f$ of arc shape cross section. A pneumatic tire $17^t$ is secured to this felly, this tire being different from the ordinary pneumatic tire in that it is thicker and has a flat outer surface which is grooved as shown at $17^g$. Arranged to extend over the drive wheel and its corresponding idler, is an endless belt 18 which is made preferably of steel tempered so as to pass around the wheels without being permanently set or bent. Secured to one side of this belt is a series of cleats 19 like that shown in Fig. 11. Each cleat is provided with a central lug $19^s$ which passes through the belt 18 and has at the end a metal cap 20, the lug being upset or riveted to the cap so as to hold the cleat firmly to the belt. The cap 20 and the rivet are smoothed off so as to provide traction members for the drive wheels, as hereinafter explained. The lug $19^x$ and their caps 20 engage the sides of the groove $17^g$ so as to cause the wheel to turn.

The rear wheels 16 are similar in construction to the front wheels 17, and power from the rear wheels is conveyed to the belt by a frictional engagement of the lugs $19^x$ and caps 20 with the groove which corresponds to the groove $17^g$ of the front wheel. As will be seen from the drawings, the lugs on the inner side of the belt formed by the members $19^x$ and 20, pass through the central groove 14 freely. The endless band is designed to be driven to propel the machine in a forward direction, and the runners 11 slide on this band. It will be seen later how the friction is reduced to a minimum.

In order to weight the rear part of the machine, the engine E is located toward the rear of the sled. Power is conveyed by means of sprocket wheels 21 (see Fig. 2), which are connected with the sprockets 22 on the shafts 23 of the drive wheel by a sprocket chain 24. The drive wheels are journaled in stationary bearings 25 which consist of loops formed of channel iron and secured to the side members 3. These bearings are slotted as shown at $25^x$ to permit the adjustment of the wheels longitudinally of the device.

Referring to Figs. 1, 3, 5 and 7, it will be seen that the front wheels 17 are each journaled in an elongated bearing 26. This bearing 26 (see Fig. 6) is constructed of channel iron and is arranged to slide into longitudinal direction on extensions 27 (see Fig. 3), of the side frame members 3, these extensions being secured to these frame members 3 in a similar manner to the bearings 25 of the rear wheel. The forward part of the elongated bearing 26 has forwardly extending bolts 28 having holding heads 29 (see Fig. 7), which are pressed on by springs 30, the opposite ends of these springs bearing upon heads 31 which are pressed on by nuts 32 or bolts 33 secured to a fixed portion 34 of the frame. These springs are for the purpose of exerting tension on the wheels 17 so as to keep the endless belt tight. The tension may be varied by means of the nuts 32. In order to guide the belt in its movement over the wheel 17, I provide the guide disks 35 (see Figs. 3 and 6), these disks being mounted in bearings 36 so as to rotate. This keeps the belt in position.

Figure 5:
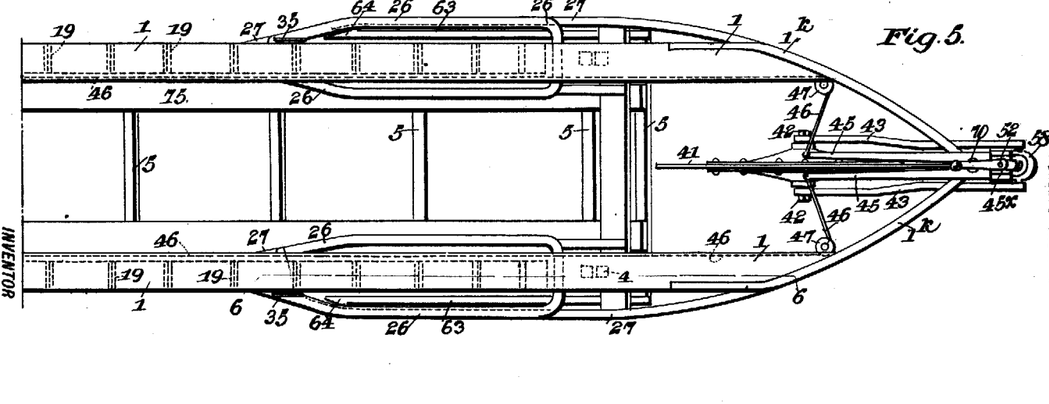
Fig. 5 is a plan view of the front half of the sled.

As will be seen from the drawings, the top frame members 1 have extensions 1ᵏ which are curved and which are secured to a post 37. The extensions 27, as will be seen from Fig. 3, are curved inwardly and upwardly and are secured to the bottom part of the post 37. In Fig. 5 these extensions 27 are shown extending outwardly beyond the upper frame members 1, but they are curved so as to lie just beneath the extensions 1ᵏ somewhat similar to the frame timbers of a boat. At the very bottom of the post 37 are secured rearwardly and downwardly extending buffers 38, these being made preferably of wood faced with steel. The lower end of these buffers are secured to struts or braces 4 by means of rawhide thongs 6. A brace member 39 is secured to one of the struts 4 and to the end of the buffer 38, this brace member 39 bearing a guide disk 40 similar to the disk 35 already described.

Disposed between the opposing side members 1ᵏ, 27 and 38 in front of the wheel 17, and in the rear of the post 37, is a steering wheel 41. This steering wheel, as will be seen, consists of a disk of considerable diameter. It is mounted on an axle 42 which is carried at the rear ends of a pair of arms 43, these arms being pivotally secured to a steering rod 44 which extends through the interior of the post 37 (see Figs. 3 and 17). At the upper end of the steering rod 44 is secured a plate 45 which is slotted so as to straddle the wheel 41. To the rear ends of the arms thus formed, flexible members such as ropes or cables 46, are secured and pass over pulleys 47, thence rearwardly and around the pulleys 48, and thence around a drum 49 which is on the shaft of the steering wheel 50 (see Figs. 2 and 4). The front end of the plate 45 is extended and is provided with ears 45ˣ (see Fig. 19), to which is pivotally secured a yoke 51. This yoke is for the purpose of pivotally supporting a rod 52 by means of which the arms 43, and through them the guide wheel 41, may be raised or lowered.

Figures 17, 18, 19, 20, 21:
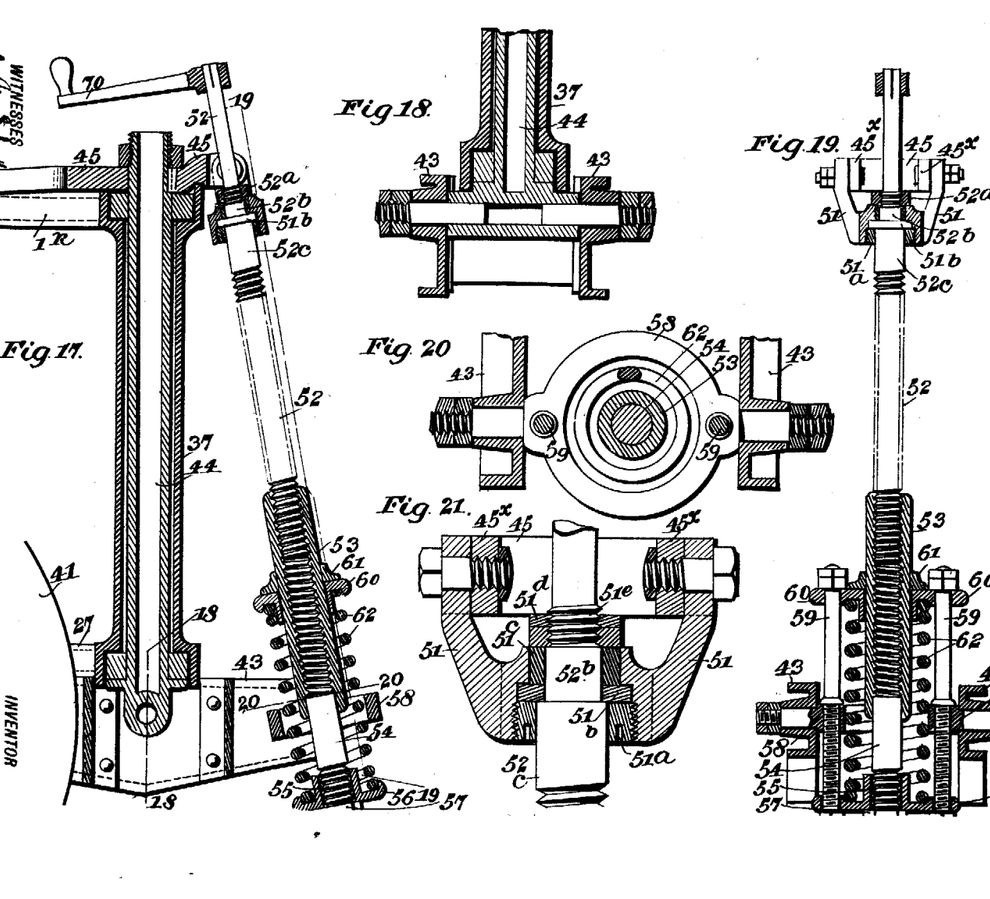
Fig. 17 is a section through the steering wheel adjusting means.
Fig. 18 is a section along the line 18—18 of Fig. 17.
Fig. 19 is a section along the line 19—19 of Fig. 17.
Fig. 20 is a section along the line 20—20 of Fig. 17.
Fig. 21 is an enlarged section of a portion of the apparatus shown in Fig. 19.

In Fig. 21 I have shown the detailed construction by means of which the yoke 51 also serves as a thrust bearing for the rod 52. It will be seen that the rod 52 has a small diameter at the top and is provided with threads 52ª for a portion of its length. The rod is enlarged at 52ᵇ just below the threaded portion, and is further enlarged as shown at 52ᶜ. The rod is threaded from the portion 52ᶜ to its end. In order to provide a thrust bearing in the yoke 51, and at the same time to permit the turning of the rod, I provide a screw plug 51ª which surrounds the portion 52ᶜ of the rod 52, the latter being free to turn. Held by the screw plug is a collar 51ᵇ which bears on the shoulder between the portions 52ᵇ and 52ᶜ of the shaft. A sleeve 51ᶜ loosely surrounds the shaft portion 52ᵇ and above this sleeve are nuts 51ᵈ, one of these nuts being a lock nut. It will be seen that by this construction a downward thrust, that is to say when the shaft is moved downward, is taken up by the nuts 51ᵈ, sleeve 51ᶜ, the collar 51ᵇ and the plug 51ª, while when the thrust is in the opposite direction, the collar 51ᵇ which bears against the yoke 51, receives the thrust. The lower end of the shaft 52 enters a threaded sleeve 53 bearing at its bottom a solid cylindrical extension 54 which is threaded at 55 and slidably carries a head 56, a nut 57 serving to hold this head in position.

Referring now to Fig. 20, it will be seen that the arms 43 have journaled therein a ring 58. The latter has threaded openings in which are disposed threaded portions of a pair of bolts 59. The lower ends of these bolts enter openings in the head 56, being slidably disposed with respect to the head and not threaded into the head. The upper part of these bolts pass through a head 60 which is slidably disposed with respect to the sleeve 53. In Fig. 19 I have shown the head 60 as abutting a stop 61, which is rigidly secured to the sleeve 53. A spiral spring 62 surrounds the sleeve 53 and bears at one end against the head 56 and at the other against the head 60, this spring 62 being disposed within the ring 58.

Carried by the floor beams 5 are rearwardly and downwardly curved arms 63. There are two of these arms on each side of the machine, one arm on each side of the belt 18. These arms are spring arms and bear at their ends scrapers 64. The scrapers are outwardly inclined so that as the vehicle is propelled forwardly the scrapers tend to throw snow between the belt and the forward edge of the runners 11, for the purpose of lubricating the surface between the runners and the belt. I have found that snow, such as that which occurs in northern countries like Alaska, in granulated condition, forms the very best lubricant between metal surfaces, such as steel against steel. If the scrapers 64 meet an obstruction, the arms 63 give so that they pass over the obstruction without being broken and will again spring into place.

From the foregoing description of the various parts of the device, the operation thereof may be readily understood.

It is essential that the greater part of the weight shall come at the rear of the device. To this end the engine is located toward the rear and the operator's seat is in the rear of the engine. The idea is to keep the forward end as light as possible. It is desirable to have the forward edge of the runners on top of the snow. Now, when the machine is propelled forwardly, the tendency is to raise the device and keep it from sinking as far into the snow as it would otherwise do, in the same manner that a hydroplane is raised out of the water. Obviously, the faster the machine goes, the greater will be this lifting tendency.

The movement of the endless belts will cause the forward movement of the machine, and the scrapers will throw the snow between the belt and the runners so that the latter will slide over the belt as a track. In running over a packed trail, the steering wheel 41 is raised so that the lower edge of the wheel does not enter very deep into the snow, but at times it may be necessary, when traversing soft snow, to lower the wheel. This is effected by means of the handle 70; however, it will be observed that on turning this handle the rod 52 will be turned so as to enter farther into the sleeve 53 where it is desired to lower the wheel 41, thus raising the arms 43 and causing them to swing on their pivots so as to lower the guide wheel. The rotation of the handle in the opposite direction will, of course, raise the wheel.

The mounting of this wheel 41 prevents damage to the wheel from coming in contact with objects such as logs, ice hummocks, etc. It will be observed that when the wheel is raised, as for instance in encountering a log, the front portion of the arms 43 is moved downwardly. This moves the ring 58 to which these arms are connected, and also the bolts 59 (see Fig. 19). The head is carried downwardly by the bolts against the tension of the spring 62. The spring 62, therefore, absorbs the shock which might otherwise injure the guide wheel.

In steering the device, the operator turns the wheel 50, which causes the swinging of the slotted arm 45 which straddles the guide wheel 41. This arm, as seen from Fig. 17, is secured to the rod 44, and this rod which has attached to it at its lower ends, the arms 43, tends to swing these arms and hence the guide wheel in proportion, as the steering wheel 50 is turned. Now, the rod 52 is carried at the upper end by means directly connected with the arm 45, and at the lower end by means directly connected with the arms 43, and hence this rod will be swung with the arm 43 from one side to the other as the guide wheel 41 is manipulated.

Figure 11:
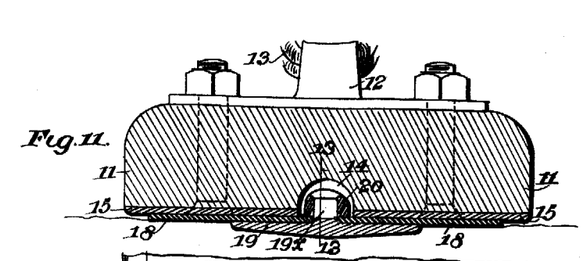
Fig. 11 is an enlarged section on the line 11—11 of Fig. 6.
Figure 14:
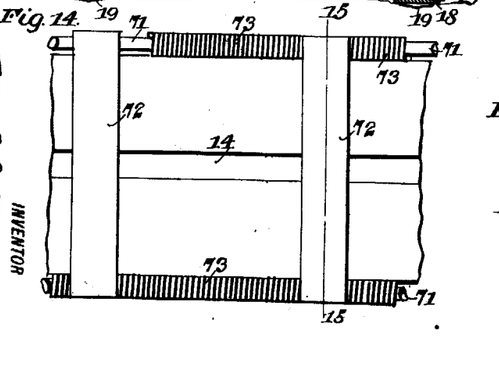
Fig. 14 is a bottom plan view of a modified form of the endless traction member.
Figures 15, 16:
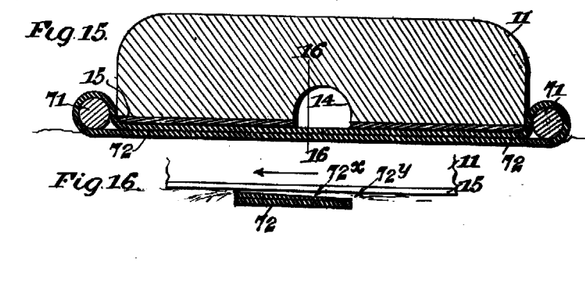
Fig. 15 is a section along the line 15—15 of Fig. 14.
Fig. 16 is a section along the line 16—16 of Fig. 15.

The parts shown in Fig. 11 are those which are used in winter. In the fall and spring when the weather is not so cold and there is not the liability of frost adhering to the runner, the parts shown in Figs 14, 15 and 16 are used. To this end the runner 11 has on each side of it, an endless cable 71 and at intervals there is secured to the cables loops of metal 72, these being flat on the bottom and being preferably bent over the cables, and then being brought down against the flat portion, the ends of the strips being brazed or otherwise secured together. Between adjacent strips 72 (see Fig. 14), I wind the cables with wire 73 which is secured in position by soldering or otherwise. The wire surface has a triple purpose. It serves to space the strips 72 apart, it serves to increase the diameter of the cables so that they are substantially flush with the rounded portion of the strips which pass around the cable, thus preventing the breaking of the strips by the edge of the runner, and they also serve as grips for gripping the snow to aid the strips 72 in propelling the sled forwardly. It will be noted that in this form of construction the sled runner slides virtually on the snow, in other words, the greater part of the runner rests on the snow, while a smaller portion of the runner rests on the strips or cleats 72.

As will be seen from Fig. 16, the portion of the strip or cleat 72 which lies next to the runner, is bevel, as shown in Fig. 16, at $72^x$, from one side to the other, so as to leave an open space $72^y$ on the rear side. The runner 11 is moving in the direction shown by the arrow in Fig. 16, and the steel shoe of the runner will draw in the loose snow at the opening $72^y$, this snow will then be forced toward the opposite side and will be gradually crowded against the runner, thus effecting a good surface upon which the runner may glide, in other words, lubricating the surface. This snow, however, keeps working out at the forward end of the cleat 72, as shown in Fig. 16. Since the action is continuous and more snow is coming in all the time, the runner will easily glide over the cleats.

Figures 12, 13:
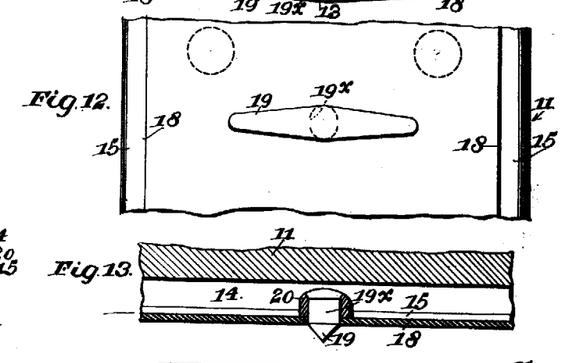
Fig. 12 is a bottom plan view of the parts shown in Fig. 11.
Fig. 13 is a section along the line 13—13 of Fig. 11.

As will be seen from Fig. 12, the lugs $19^x$ are elliptical in cross section and they enter elliptical openings in the belt 15. The cleats are not riveted tightly to the belt, but are permitted to have a little play so that when the belt passes around the wheels, it will not be under strain which might tend to break it. The cleat 19 is prevented from rotating about the lug as a center, because of the fact that the lug is elliptical. This form holds the cleat at right angles to the line of travel and at the same time prevents the tearing of the sides of the opening, which might occur if the lug were of square or otherwise angular cross section.

I claim:

1. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, and transverse cleats secured to said belts on the outer side thereof.

2. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, and means for feeding snow between the belt and the forward ends of the runners.

3. In a motor sled, an elongaed frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, means for feeding snow between the belt and the forward ends of the runners, said snow feeding means comprising spring arms secured in front of the idler wheels on each side thereof, and scrapers carried by said spring arms and arranged to engage the snow slightly in advance of the runners, said scrapers being positioned to force the snow in front of the runners.

4. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, and a guide wheel carried by the sled in advance of the idler wheels, said guide wheels being normally disposed on a horizontal axis in a vertical plane midway between the idler wheels.

5. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, a guide wheel carried by the sled in advance of the idler wheels, said guide wheel being normally disposed on a horizontal axis in a vertical plane midway between the idler wheels, and means for shifting the axis of the guide wheel to different positions in a horizontal plane.

6. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, a guide wheel carried by said sled in advance of said idler wheels and on a line midway between them, means for shifting said guide wheel into different vertical planes, and spring means for permitting a vertical movement of the guide wheel when an obstruction is encountered.

7. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, a post disposed at the front of the sled, the side members of the frame being curved inwardly and being connected with said post, arms pivotally carried by said post, and a guide wheel mounted for rotation in a vertical plane between said arms.

8. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, a post disposed at the front of the sled, the side members of the frame being curved inwardly and being connected with said post, arms pivotally carried by said post, a guide wheel mounted for rotation in a vertical plane between said arms, and means for swinging the arms about the axis of the post as a center for moving the guide wheel to different vertical planes.

9. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, a post disposed at the front of the sled, the side members of the frame being curved inwardly and being connected with said post, arms pivotally carried by said post, a guide wheel mounted for rotation in a vertical plane between said arms, and means for swinging the pivoted arms so as to raise or lower the guide wheel.

10. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, a post disposed at the front of the sled, the side members of the frame being curved inwardly and being connected with said post, arms pivotally carried by said post, a guide wheel mounted for rotation in a vertical plane between said arms, means for swinging the pivoted arms so as to raise or lower the guide wheel, and spring means for permitting the further movement of the guide wheel in a vertical plane when an obstruction is met.

11. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runners being upwardly curved and terminating short of the front idler wheel, said runners being arranged to slide on said belts, transverse cleats secured to said belts on the outer side thereof, each of said wheels having a resilient tire provided with a centrally disposed circumferential groove, and means carried on the inner side of the belt for frictionally engaging the walls of the groove.

12. In a motor sled, an elongated frame, a pair of driving wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, each of said wheels having a resilient tire provided with a centrally disposed circumferential groove, the cleats of said belt having lugs arranged to extend through the belts, said lugs being riveted to said belt and the riveted portion constituting friction members for engaging the inner walls of the groove.

13. In a motor sled, an elongated frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of said runner being upwardly curved and terminating short of the front idler wheel, said runners being arranged to slide on said belts, transverse cleats secured to said belts on the outer side thereof, each of said wheels having a resilient tire provided with a centrally disposed circumferential groove, the cleats of said belt having lugs arranged to extend through the belts, said lugs being riveted to said belt and the riveted portion constituting friction members for engaging the inner walls of the groove, said runners being provided with a central groove to permit the free passage of the lugs.

14. In a motor sled, a frame consisting of longitudinal side members, brace members yieldingly secured to said side members, runners disposed at the bottom of the brace members, means for yieldingly connecting said runners with said brace members, cross members, means for yieldingly connecting the brace members with said cross members, one of said side frame members being extended to form a loop at each end, a drive wheel journaled in one of said loops, and an idler wheel journaled in the other loop.

15. In a motor sled, a frame consisting of longitudinal side members, brace members yieldingly secured to said side members, runners disposed at the bottom of the brace members, means for yieldingly connecting said runners with said brace members, cross members, means for yieldingly connecting the brace members with said cross members, one of said side frame members being extended to form a loop at each end, a drive wheel journaled in one of said loops, an idler wheel journaled in the other loop, and an endless belt arranged to pass over said drive wheel and said idler wheel, said runner being arranged to rest on said endless belt.

16. In a motor sled, a frame consisting of longitudinal side members, brace members yieldingly secured to said side members, runners disposed at the bottom of the brace members, means for yieldingly connecting said runners with said brace members, cross members, means for yieldingly connecting the brace members with said cross members, one of said side frame members being extended to form a loop at each end, a drive wheel journaled in one of said loops, an idler wheel journaled in the other loop, an endless belt arranged to pass over said drive wheel and said idler wheel, said runner being arranged to rest on said endless belt, and means for shifting the position of the idler wheel to vary the tension on the belt.

17. In a motor sled, a frame consisting of longitudinal side members, brace members yieldingly secured to said side members, runners disposed at the bottom of the brace members, means for yieldingly connecting said runners with said brace members, cross members, means for yieldingly connecting the brace members with said cross members, one of said side frame members being extended to form a loop at each end, a drive wheel journaled in one of said loops, an idler wheel journaled in the other loop, the journal for said idler wheel being slidable with respect to the loop, and means for adjusting the position of the slidable idler wheel to vary the tension on the belt.

18. In a motor sled, a frame consisting of longitudinal side members, brace members yieldingly secured to said side members, runners disposed at the bottom of the brace members, means for yieldingly connecting said runners with said brace members, cross members, means for yieldingly connecting the brace members with said cross members, one of said side frame members being extended to form a loop at each end, a drive wheel journaled in one of said loops, an idler wheel journaled in the other loop, the journal for said idler wheel being slidable with respect to the loop, and means for adjusting the position of the slidable idler wheel to vary the tension on the belt, said last named means comprising a pair of springs arranged to bear normally at one end on a fixed portion of the frame, and at the other end on a portion of the slidable bearing for the wheel, and means for moving the slidable bearing against the tension of the spring.

19. In a motor sled, an elongated frame, a pair of drive wheels carried by said frame at the rear end thereof, a pair of idler wheels carried by the frame near the front end, a guide wheel disposed in front of said idler wheels and midway between them, an endless flexible member arranged to run over one of the drive wheels and an idler wheel, a runner carried by said sled on each side and arranged to slide on said endless flexible member, cleats carried by said endless flexible member, means for guiding said endless flexible member, to maintain the latter on the wheels, and an engine for rotating the drive wheels, said engine being disposed to the rear of the center of gravity of the machine, thereby normally tilting up the forward end of the device.

20. In a motor sled, an elongated frame, a pair of drive wheels carried by said frame at the rear end thereof, a pair of idler wheels carried by the frame near the front end, a guide wheel disposed in front of said idler wheels and midway between them, an endless flexible member arranged to run over one of the drive wheels and an idler wheel, a runner carried by said sled on each side and arranged to slide on said endless flexible member, cleats carried by said endless flexible member, means for guiding said endless flexible member to maintain the latter on the wheels, an engine for rotating the drive wheels, said engine being disposed to the rear of the center of gravity of the machine, thereby normally tilting up the forward end of the device, and means disposed in the rear of the engine for operating the guide wheel.

21. In a motor sled, an elongated frame, a pair of drive wheels carried by said frame at the rear end thereof, a pair of idler wheels carried by the frame near the front end, a guide wheel disposed in front of said idler wheels and midway between them, an endless flexible member arranged to run over one of the drive wheels and an idler wheel, a runner carried by said sled on each side and arranged to slide on said endless flexible member, cleats carried by said endless flexible member, means for guiding said endless flexible member to maintain the latter on the wheels, an engine for rotating the drive wheels, said engine being disposed to the rear of the center of gravity of the machine, thereby normally tilting up the forward end of the device, means disposed in the rear of the engine for operating the guide wheel, and curved buffers disposed on each side of said guide wheel and extending rearwardly toward said idler wheels.

22. In a motor sled, an elongated frame, a pair of drive wheels carried by said frame at the rear end thereof, a pair of idler wheels carried by the frame near the front end, a guide wheel disposed in front of said idler wheels and midway between them, an endless flexible member arranged to run over one of the drive wheels and an idler wheel, a runner carried by said sled on each side and arranged to slide on said endless flexible member, cleats carried by said endless flexible member, means for guiding said endless flexible member to maintain the latter on the wheels, an engine for rotating the drive wheels, said engine being disposed to the rear of the center of gravity of the machine, thereby normally tilting up the forward end of the device, means disposed in the rear of the engine for operating the guide wheel, curved buffers disposed on each side of said guide wheel and extending rearwardly toward said idler wheels, and means for scraping snow between said runners and said flexible member.

23. In a motor sled, a frame, an endless belt, driving mechanism carried by the frame at one end thereof for driving said endless belt and for constituting load-supporting means, and a runner secured to the frame and arranged to slide on the endless belt.

24. In a motor sled, a frame, an endless belt, driving mechanism carried by the frame at the rear end thereof for driving said endless belt and for constituting load-supporting means, a runner secured to the frame and arranged to slide on the endless belt, and an idler for supporting the forward portion of the endless belt.

25. In a motor sled, a frame, a pair of driving wheels carried by the frame at the rear end thereof and constituting load-supporting means, a pair of idlers, an endless belt at each side of the frame arranged to run over one of said drive wheels and one of said idlers, and a runner secured to the frame at each side thereof and arranged to slide on its individual endless belt.

26. In a motor sled, a frame, a pair of driving wheels carried by the frame at the rear end thereof, a pair of idlers, an endless belt at each side of the frame arranged to run over one of said drive wheels and one of said idlers, a runner secured to the frame at each side thereof and arranged to slide on its individual endless belt, and a guide wheel in advance of said idlers.

27. In a motor sled, a frame, a pair of driving wheels carried by the frame at the rear end thereof, a pair of idlers, an endless belt at each side of the frame arranged to run over one of said drive wheels and one of said idlers, a runner secured to the frame at each side thereof and arranged to slide on its individual endless belt, and a guide wheel in advance of said idlers, said guide wheel being mounted to move vertically against spring tension.

28. In a motor sled, a frame, a pair of drive wheels carried by said frame at the rear end thereof, means for rotating said drive wheels, a pair of idler wheels at the opposite end of the frame, a pair of runners for said frame, an endless belt arranged to run over a drive wheel and an idler on each side of the sled, the forward end of each runner being upwardly curved and terminating short of the front idler wheel, said runners being arranged to slide on said belt.

FRANK G. HORNER.

Copies of this patent may be obtained for five cents each, by addressing the "Commissioner of Patents, Washington, D. C."